United States Patent
Sagan

(10) Patent No.: US 10,701,105 B2
(45) Date of Patent: Jun. 30, 2020

(54) METHOD FOR WEBSITE AUTHENTICATION AND FOR SECURING ACCESS TO A WEBSITE

(71) Applicant: ADVANCED TRACK & TRACE, Rueil-Malmaison (FR)

(72) Inventor: Zbigniew Sagan, Rueil-Malmaison (FR)

(73) Assignee: ADVANCED TRACK & TRACE, Rueil-Malmaison (FR)

( * ) Notice: Subject to any disclaimer, the term of this patent is extended or adjusted under 35 U.S.C. 154(b) by 160 days.

(21) Appl. No.: 15/759,248

(22) PCT Filed: Sep. 14, 2016

(86) PCT No.: PCT/FR2016/052322
§ 371 (c)(1),
(2) Date: Mar. 12, 2018

(87) PCT Pub. No.: WO2017/046522
PCT Pub. Date: Mar. 23, 2017

(65) Prior Publication Data
US 2018/0270272 A1    Sep. 20, 2018

(30) Foreign Application Priority Data
Sep. 14, 2015  (FR) ...................... 15 58550

(51) Int. Cl.
*H04L 29/06* (2006.01)
*H04L 9/32* (2006.01)
(Continued)

(52) U.S. Cl.
CPC .......... *H04L 63/1483* (2013.01); *G06F 21/34* (2013.01); *G06F 21/36* (2013.01); *H04L 9/32* (2013.01); *H04L 63/08* (2013.01)

(58) Field of Classification Search
CPC ....... H04L 63/1483; H04L 9/32; H04L 63/08; H04L 29/06; G06F 21/34; G06F 21/36
See application file for complete search history.

(56) References Cited

U.S. PATENT DOCUMENTS 9,825,947 B2 * 11/2017 Jass ..................... H04L 63/0869
2008/0052245 A1 * 2/2008 Love ....................... G06F 21/36
705/76

(Continued)

FOREIGN PATENT DOCUMENTS

FR          3018127 A1 *  9/2015

*Primary Examiner* — Jayesh M Jhaveri
(74) *Attorney, Agent, or Firm* — Patshegen IP LLC; Moshe Pinchas

(57) ABSTRACT

The invention relates to a method for securing access to a website which includes, in series:
 a step (202) of a first user terminal accessing said site;
 a step (206) of entering a message with the user terminal on a page of the site;
 a step (208) of transmitting the message to a server of the website;
 a step (210) of the server of the website encrypting the message in order to form a visible code;
 a step (212) of displaying the visible code on a display screen of the first user terminal;
 a step (216) of taking an image of the visible code using a second user terminal, optionally identical to the first user terminal;
 a step (218) of decrypting the code using the second user terminal; and
 a step (220) of providing the user with the message decrypted by the second user terminal.

13 Claims, 4 Drawing Sheets

(51) Int. Cl.
*G06F 21/34* (2013.01)
*G06F 21/36* (2013.01)

(56) References Cited

U.S. PATENT DOCUMENTS

| | | | | |
|---|---|---|---|---|
| 2009/0077373 | A1* | 3/2009 | Kramer | H04L 63/168 |
| | | | | 713/155 |
| 2012/0240204 | A1* | 9/2012 | Bhatnagar | G06F 21/35 |
| | | | | 726/5 |
| 2014/0317713 | A1* | 10/2014 | Gadotti | H04L 63/0853 |
| | | | | 726/7 |
| 2014/0351902 | A1* | 11/2014 | Kim | H04L 63/1483 |
| | | | | 726/5 |
| 2015/0089568 | A1* | 3/2015 | Sprague | H04L 63/0876 |
| | | | | 726/1 |
| 2015/0143481 | A1* | 5/2015 | Chen | H04L 63/12 |
| | | | | 726/5 |
| 2016/0241592 | A1* | 8/2016 | Kurkure | H04L 63/1483 |

\* cited by examiner

METHOD FOR WEBSITE AUTHENTICATION AND FOR SECURING ACCESS TO A WEBSITE

TECHNICAL FIELD OF THE INVENTION

The present invention concerns a method for website authentication and for securing access to a website. It applies, in particular, to preventing "phishing" types of fraud for both sites and their users.

STATE OF THE ART

"Phishing" is a technique used by fraudsters to obtain personal information in order to commit identity theft. The technique consists of masquerading as a trusted third party—bank, administration, etc—in order to obtain the victim's personal information: password, credit card number, date of birth, etc. This is a form of cyberattack based on social engineering. It can be carried out by e-mail, fake websites or other electronic means. When this technique uses short messages ("SMS"), it is called SMiShing.

Phishing attacks are most often directed at sensitive sites, such as bank sites. Social network sites are now the target of these attacks as well. The profiles of the social networks' users include many private elements that enable hackers to enter into the life of the persons targeted and successfully retrieve sensitive information.

Computer criminals generally use phishing to steal money. The most common targets are on-line banking services, internet service providers, auction sites such as eBay (registered trademark), and the PayPal (registered trademark) payment system. The phishers usually send e-mails to a large number of potential victims.

Typically, the messages sent in this way appear to come from a trustworthy company and are worded in such a way that the recipient is alarmed and carries out an action as a result. An approach used frequently is to indicate that the victim's bank account has been disabled because of a problem and that it can only be reactivated if the victim performs an action. The message therefore provides a hyperlink directing the user to a web page that closely resembles the trustworthy company's real site. On arriving on this fake page, the user is prompted to enter confidential information which the criminal then records.

Defenses against these attacks are entirely dependent on the users' attention:

A/ Checking the spelling of the domain name.
The faulty syntax and unsuitable nature of the Web address proposed in the body of the message are likely to trigger suspicions.
Checking the web address in the web browser's address bar is the first defense. A simple attack consists of using a very similar domain name (eg with a grammatical or spelling error), such as http://www.compagniegeneral.fr instead of http://www.compagniegenerale.fr. The attacker will have previously bought a domain name close to the original, generally a spelling variant.

B/ Checking for the absence of a "commercial at" sign in the URL ("Uniform Resource Locator").
In the 1990s and the early 2000s, the attackers developed a URL that resembled a legitimate URL, by writing the usurped domain name as the login. As a result of this phishing technique, web browsers have been improved so as to warn their users when they detect this maneuver. This phishing technique is therefore now in a minority.

C/ Check for the absence of Unicode characters
A more sophisticated method for masking the actual domain name consists of using characters chosen carefully from among the tens of thousands of Unicode characters. This is because some special characters look like characters from the Latin alphabet, but the address directs to a different website.
One countermeasure to this attack is not to allow characters outside the ASCII range, which only contains the letters A to Z, numbers and punctuation characters, to be displayed. Nevertheless, this countermeasure is not readily compatible with the internationalization of domain names, which require the set of Unicode characters.

D/ Check the electronic certificates Since the 1990s there has been a technical defense against phishing: the electronic certificate. However, the user interface of web browsers has long made the certificates unintelligible for visitors. This interface was well-known as a small padlock. The public was simply told that the padlock means that the communication is encrypted, which is true, but in no way protects against phishing. In the 2000s, extended certificates were invented. They enable a site's verified identity to be displayed more clearly.

E/ Write the URLs manually
A person contacted about an account that has to be "verified" must seek to resolve the problem directly with the company concerned or go to the website by entering the address manually in the web browser's address bar, rather than clicking on a link that has been provided.

F/ Use the anti-spam filters
Anti-spam filters help to protect the user from computer criminals because they reduce the number of emails users receive, and consequently the risks of phishing.

As can be easily understood, these defenses are insufficient: They require complicated, time-consuming steps that very few internet users have mastered.

However, the most obvious errors of the earliest phishing attempts have now been corrected and the risk increased as a result.

Document FR 3 018 127 describes a method for securing access to a website by generating a logo representative solely of parameter values for the server hosting this site. This method does not enable easy verification of the site's validity. It is noted that no message is entered on a page of this site, a page address of this site not being able to be mistaken for a message, since it is invariable and a message must contain a variable portion making up its meaning. In addition, no message supplied by the user is represented by the generated logo.

Document US 2012/240204 describes an encryption of authentication data ("credentials") for the user (login and/or password) and a security server. The encrypted data is received by a user terminal and transmitted to a third-party server, which verifies this authentication data. This complex method does not enable easy verification of the site's validity. It is noted that no message is entered on a page of this site, a login and/or a password not being able to be mistaken for a message, since they are invariable and a message must contain a variable portion making up its meaning. In addition, the user cannot verify the site's authenticity alone.

SUBJECT OF THE INVENTION

The present invention aims to remedy all or part of these drawbacks.

To this end the present invention relates to a method for securing access to a website which includes, in series:

a step of a first user terminal accessing said site;
a step of entering a message, using the user terminal, on a page of the site;
a step of transmitting the message to a server of the website;
a step encrypting the message by the server of the website in order to form a visible code;
a step of displaying the visible code on a display screen of the first user terminal;
a step of taking an image of the visible code using a second user terminal, optionally identical to the first user terminal;
a step of decrypting the code using the second user terminal; and
a step of providing the user with the message decrypted by the second user terminal.

Thanks to these provisions, the user either recognizes his message immediately or not, and thereby authenticates the website he is accessing. Knowing the decryption key, the second user terminal allows the user to verify an intelligible message and therefore to verify that the site visited is the site associated to a server having the encryption key, ie that this site is the legitimate site he wishes to access. As the message has been chosen by the user, it is personal to him, unpredictable and, preferably, variable between two successive accesses to the site, or unique, to strengthen the security.

It is noted here that the term unpredictable does not mean that the format of the message is unknown to the site's server, but that the content of the message is chosen freely by the user, and therefore unknown to the site's server.

In some embodiments, the message represents a gesture by the user.

In some embodiments, the message comprises a series of images of the user.

In some embodiments, the message comprises an alphanumeric portion entered by the user.

In some embodiments, the message comprises at least one item of biometric data of the user.

In some embodiments, the message comprises a photograph of the user.

In some embodiments, the message comprises a phrase spoken by the user.

In some embodiments, the message is representative of a pointer movement made by the user.

For example, the message represents the confirmation click on the "shopping basket" listing the objects and/or services selected by the user on the site.

In some embodiments, the code takes the form of a logo of the site.

In some embodiments, the method that is the subject of the present invention also comprises a step generating a personal code by the server, a step of transmitting the personal code within the visible code, and a step of the user, with the first user terminal, entering on a page of the site the personal code displayed by the second user terminal.

This second message allows the site's server to verify that the user of the first user terminal is the user of the second user terminal. For example, the second user terminal is a mobile telephone.

In some embodiments, the second terminal is different from the first terminal.

In some embodiments, the second terminal and the first terminal are one and the same, the image capture being commanded by a decryption system.

BRIEF DESCRIPTION OF THE FIGURES

Other advantages, aims and particular features of the present invention will become apparent from the description that will follow, made, as a non-limiting example, with reference to drawings included in an appendix, wherein.

DESCRIPTION OF EXAMPLES OF REALIZATION OF THE INVENTION

It is now noted that the figures are not to scale. Throughout the description, "a" server applies both to a single server and to a set of servers linked together and working together to perform a function.

Figure 1:
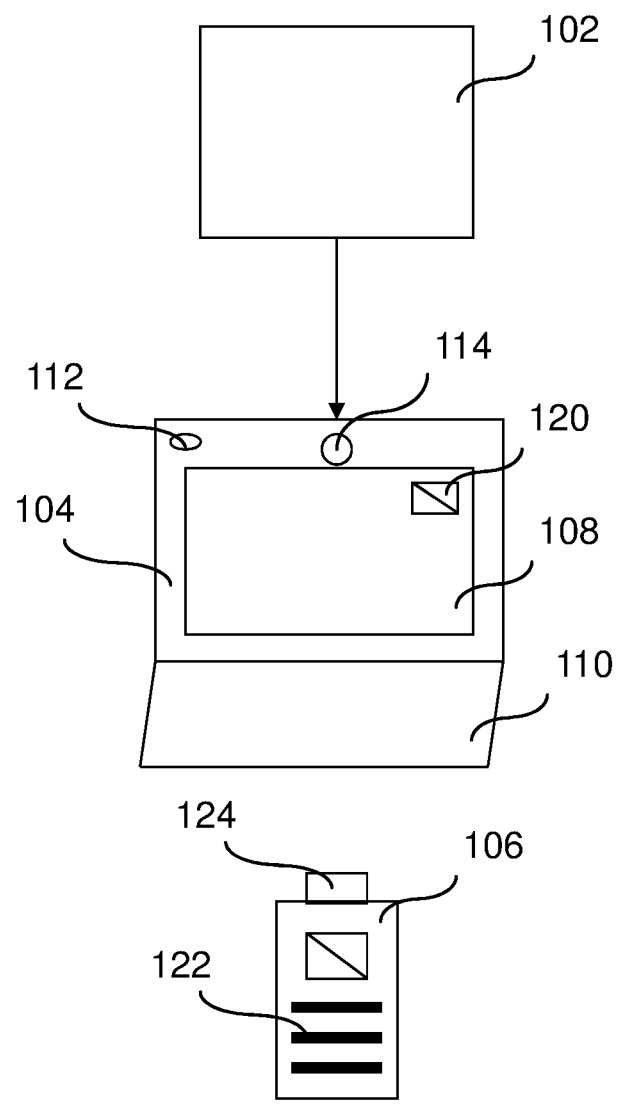
FIG. 1 represents, schematically, devices utilized in a first embodiment of the method that is the subject of the invention.

FIG. 1 shows a website server 102. The server 102 hosts at least one page 108 of the site and generates a code 120 obtained by encrypting a message, each time this page 108 is accessed by a user. The user uses two different terminals. The first, 104, for example a personal computer, tablet, smartphone, or connected object, is used to access the website.

The second user terminal, 106, is used to authenticate the site. The second user terminal 106 comprises a code sensor 124, for example an image sensor or an acousto-electric transducer, such as a microphone. The second user terminal 106 also comprises a user interface, for example a display screen or a loudspeaker. The second user terminal 106 is, for example, a camera, computer, tablet, smartphone, or connected object.

The second user terminal 106 captures the code 120, decrypts it and transmits the decrypted message 122 to the user on the user interface.

By verifying the content of the message, the user can make sure that the site page he is accessing is the page of the legitimate site and not a page of a mirror site on which he risks being the victim of a fraud.

The encryption key used can be symmetric or—preferably—asymmetric. To increase the reliability of the site's authentication, the message is preferably different for each access to the website. To increase the reliability of the site's authentication, the message is preferably personalized, ie different for each visitor to the website, and recognizable by this user as being unique to him (specific).

Preferably, the encrypted message is therefore generated from data provided by the user himself. Preferably, these data items are provided during the site access session by the first user terminal 104.

For example, the user is asked, in order to form the message, to:
  enter an alphanumeric message on the keyboard 110 of the first user terminal, possibly on a virtual keyboard, possibly ephemeral, and displayed by the site;
  move a pointer (his finger on a touch-screen or the pointer of a mouse) on the displayed page 108, in a movement of his choice;
  say a phrase in front of the microphone 112 of the first user terminal 104;
  have at least one item of biometric data (fingerprint, facial or hand recognition, etc) captured by a sensor of the first user terminal 104;

have at least one image of his face captured by an image sensor 114 of the first user terminal 104; and/or have a series of images of him captured by the image sensor 114 of the first user terminal, for example to make a gesture representative of his agreement (or acquiescence) for an access or a transaction.

Once encrypted by a security server associated with the site, this message is returned in the form of the code 120 to the first user terminal 104 and re-created, after decryption, by the second user terminal 106.

Preferably, if it is visual, the code 120 displayed on the screen of the first user terminal 104 takes the form of a logo of the site. This logo comprises variations, for example steganographic (watermark on its surface) or contour, representative of the encrypted message.

In a variant, the visible code is replaced by a sound code broadcast by the loudspeaker of the first user terminal, its capture being achieved with a microphone of the second user terminal.

Figure 2:
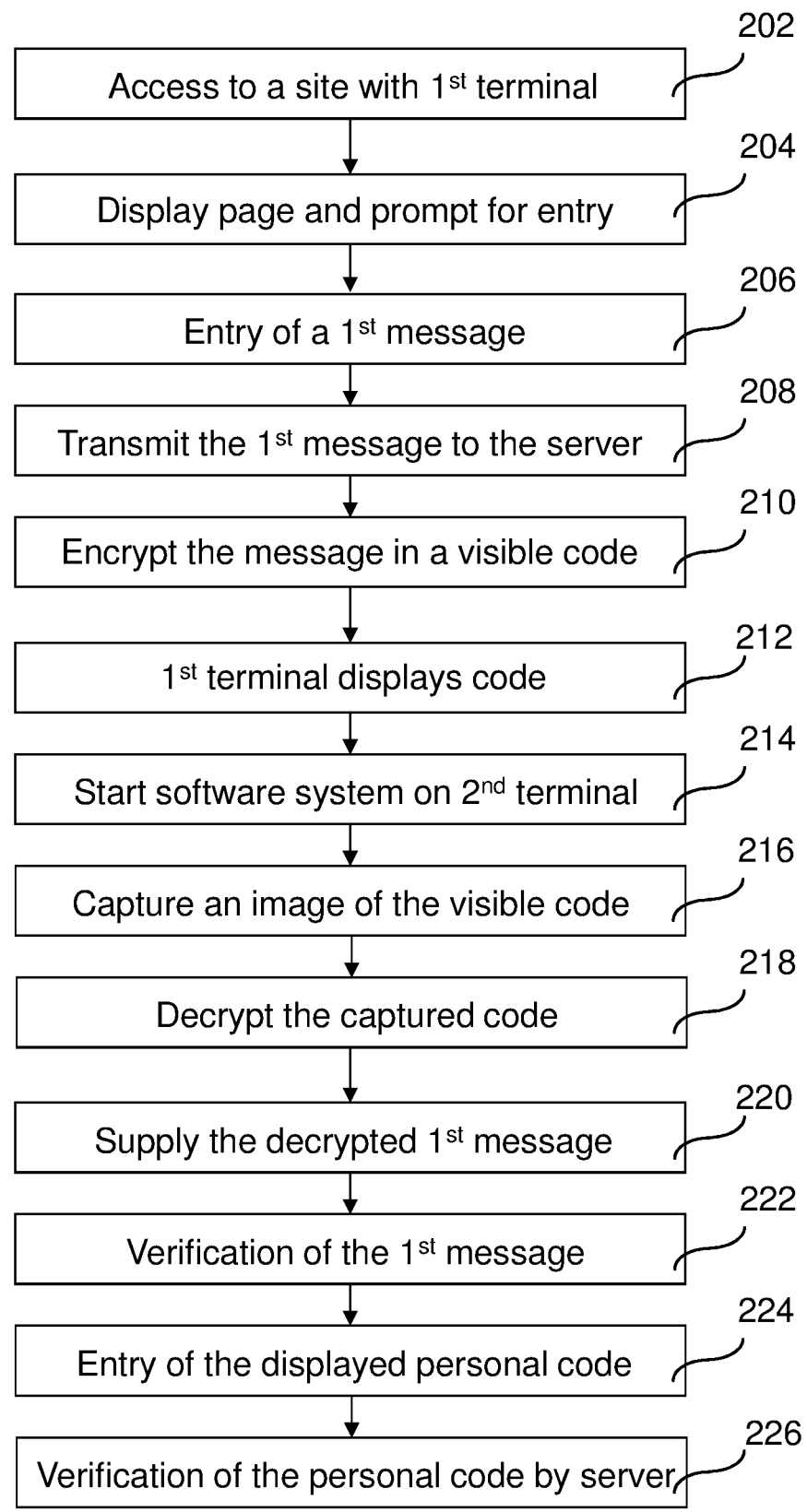
FIG. 2 represents, in the form of a logical diagram, steps utilized in the first particular embodiment of the method of the invention.

In the description of FIG. 2, the first message is considered to be an alphanumeric message entered by the user on a keyboard. The utilization of the other types of messages described above, as replacement for or in addition to the alphanumeric message entered on the keyboard, poses no difficulty to the person skilled in the art. In the description of FIG. 2, the code representing the encryption of the first message is considered to be a visible code. The utilization of the other types of codes described above, as replacement for or in addition to this visible code, poses no difficulty to the person skilled in the art.

As shown in FIG. 2, in a first embodiment, the method is automatically implemented from a step 202 of access to a website, the user using a first user terminal, for example a computer, for this access.

During a step 204, the server hosting the site supplies a page of the site and a prompt to enter a message. The first user terminal displays this page and this prompt on its display screen. The prompt comprises, for example, the display of a message such as "please now enter a message different from messages you have already entered".

During a step 206, the user enters a first message, using the first user terminal. Possibly, the site's server prohibits the same message being entered during two successive accesses to the site by the user, to prevent learning by a fraud site.

The message can take various forms, for example:
alphanumeric, for example by keyboard entry in an entry field displayed on a display screen of the first user terminal;
audible, especially vocal, by a microphone of the first user terminal capturing the sound;
visual, by capturing a photo or a series of images of the user; or
by a screenshot, at least partial, for example comprising a pointer whose position is commanded by the user, for example by means of a computer mouse.

Thus, the message can represent the acquiescence of the user (gesture, nod of the head, word of agreement, confirmation click, etc). In the event of a subsequent dispute, this can be produced by the website's operator or by the user.

During a step 208, the first user terminal transmits the first message to a server of the site, for example to the server hosting the site or to a security server linked to the server hosting the site.

During a step 210, a server (the server hosting the site or an associated security server) encrypts the first message to supply a visible code.

During a step 212, the server hosting the website transmits the visible code to the first user terminal, and the first user terminal displays this visible code on its display screen, preferably in a page of the site.

During a step 214, the user starts a decryption system on a second user terminal, for example a smartphone.

During a step 216, the user captures an image of the visible code using an image sensor of the second user terminal.

During a step 218, the decryption system decrypts the visible code and supplies the first message.

During a step 220, the second user terminal supplies the first message to the user. The user verifies this first message during a step 222. The way the message is supplied depends on its format. If the message was entered on a keyboard, the supply consists of displaying this message on a display screen of the second user terminal. If the message is visual, for example a photo of the user or a series of images of the user or a capture, partial or not, of the movement of a pointer on a page of the site, supplying the message consists of displaying one or more images on the display screen of the second user terminal. If the message is audible, especially vocal, supplying the message consists of a loudspeaker playing the sound message.

If the message displayed on the second user terminal is different from the first message entered by the user during the step 206, the user knows that he is not on a legitimate site.

It can be seen that the method described with reference to FIG. 2 operates according to the challenge-response method, the challenge being freely chosen by the user and the response being identical to the challenge but after encryption and decryption. The correspondence between the encryption and decryption ensures authentication of the site by the user.

In a variant, during steps 210 to 220, the visible code is also representative of a second message, for example a personal identification code ("PIN"). This personal code, generated by the server of the site, is therefore displayed by the second user terminal during the step 220. In this case, during a step 224, the user enters the personal code, with the keyboard of the first user terminal or on a virtual keyboard displayed on the screen of the first user terminal. This personal code is transmitted to the server hosting the website and, if applicable, to the security server.

During a step 226, the server that generated the code to be displayed verifies the personal code. If this personal code is correct, navigation on the website is authorized.

In a variant, the first message entered by the user during the step 206 is a question from a limited number of questions, the response to which has previously been supplied to the server hosting the website by the user, for example when registering for the services of this site. In this case, during the step 210, the server finds the response to the question asked, in its memory of responses, and encrypts this response to supply the code to be displayed on the first user terminal.

Figure 3:
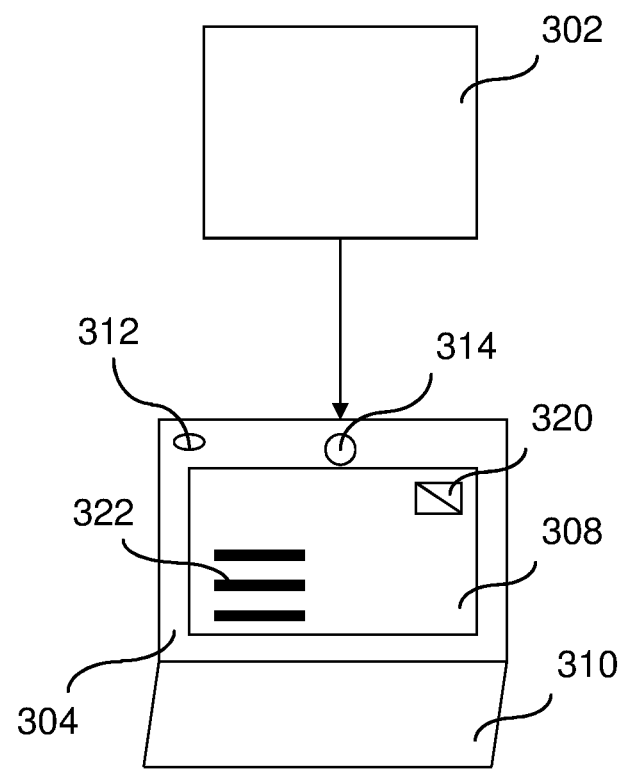
FIG. 3 represents, schematically, devices utilized in a second embodiment of the method of the invention.

FIG. 3 shows a website server 302. The server 302 hosts at least one page 308 of the site and generates a code 320 obtained by encrypting a message, each time this page 308 is accessed by a user. The user uses a single terminal, with different systems for accessing the site and for authentication. The user terminal 304, for example a personal computer, tablet, smartphone, or connected object, comprises a user interface, for example a display screen or a loudspeaker. The user terminal is used to access the website and to authenticate the site.

The decryption system can use a code sensor, for example an image sensor or an acousto-electric transducer, such as a microphone. It also comprises a user interface, for example a display screen or a loudspeaker. The decryption system decrypts the captured code 320, and transmits the decrypted message 322 to the user on the user interface of the user terminal.

By verifying the content of the message, the user can make sure that the site page he is accessing is the page of the legitimate site and not a page of a mirror site on which he risks being the victim of a fraud.

The encryption key used can be symmetric or—preferably—asymmetric. To increase the reliability of the site's authentication, the message is preferably different for each access to the website. To increase the reliability of the site's authentication, the message is preferably personalized, ie different for each visitor to the website, and recognizable by this user as being unique to him (specific).

Preferably, the encrypted message is therefore generated from data provided by the user himself. Preferably, these data items are provided during the site access session by the user terminal 304.

For example, the user is asked, in order to form the message, to:
  enter an alphanumeric message on the keyboard 310 of the user terminal, possibly on a virtual keyboard, possibly ephemeral, and displayed by the site;
  move a pointer (his finger on a touch-screen or the pointer of a mouse) on the displayed page 308, in a movement of his choice;
  say a phrase in front of the microphone 312 of the user terminal 304;
  have at least one image of him captured by an image sensor 314 of the user terminal 304; and/or
  have a series of images of him captured by the image sensor 314 of the user terminal, for example to make a gesture representative of his agreement (or acquiescence) for an access or a transaction.

Once encrypted by a security server associated with the site, this message is returned in the form of the code 320 to the user terminal 304 and re-created, after decryption, by the decryption system.

Preferably, if it is visual, the code 320 displayed on the screen of the user terminal 304 takes the form of a logo of the site. This logo comprises variations, for example steganographic (watermark on its surface) or contour, representative of the encrypted message.

Figure 4:
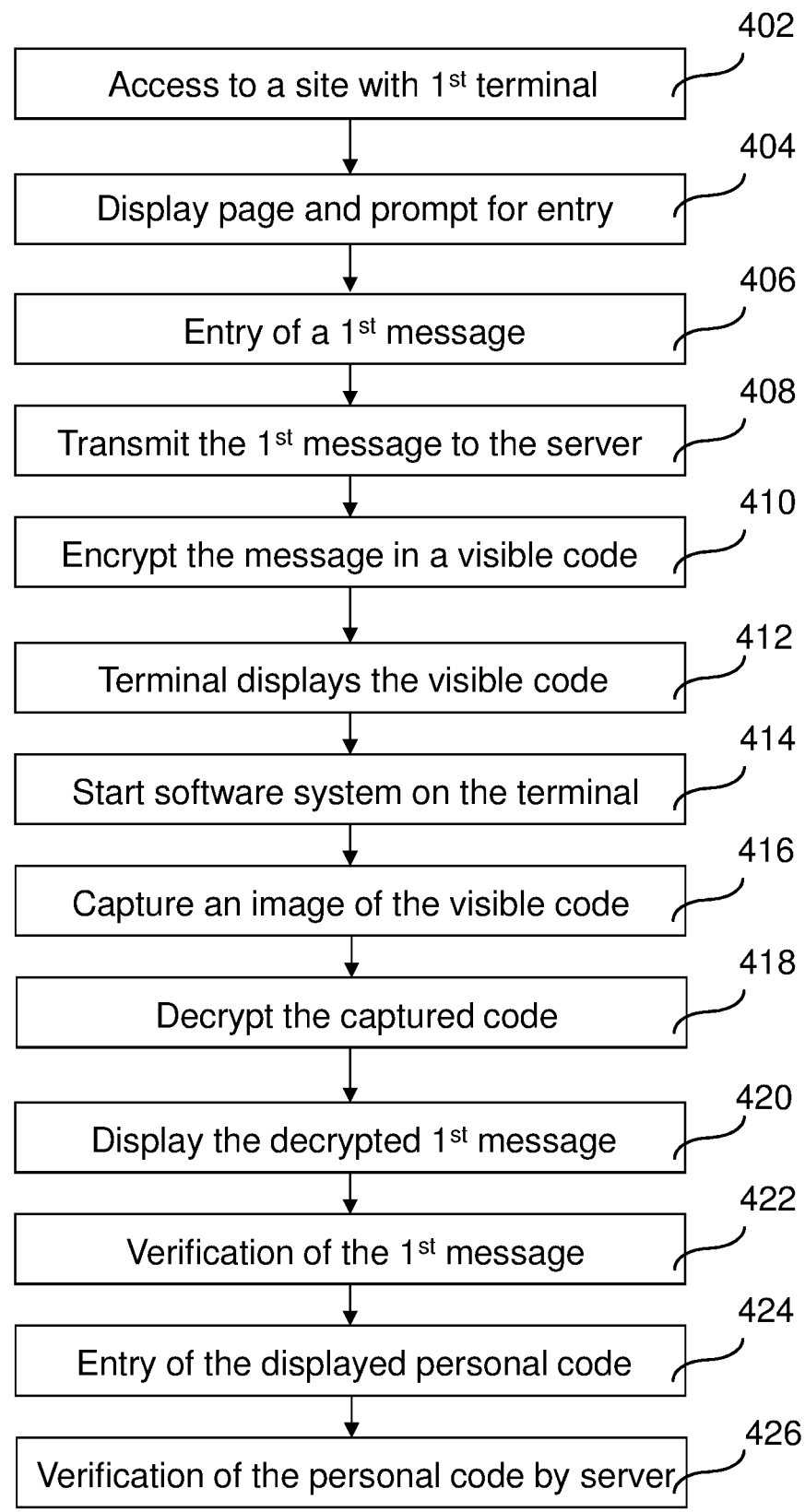
FIG. 4 represents, in the form of a logical diagram, steps utilized in the second particular embodiment of the method of the invention.

In the description of FIG. 4, the first message is considered to be an alphanumeric message entered by the user on a keyboard. The utilization of the other types of messages described above, as replacement for or in addition to the alphanumeric message entered on the keyboard, poses no difficulty to the person skilled in the art. In the description of FIG. 4, the code representing the encryption of the first message is considered to be a visible code. The utilization of the other types of codes described above, as replacement for or in addition to this visible code, poses no difficulty to the person skilled in the art.

As shown in FIG. 4, in an embodiment, the method is automatically implemented from a step 402 of access to a website, the user using a user terminal, for example a computer, for this access.

During a step 404, the server hosting the site supplies a page of the site and a prompt to enter a message. The user terminal displays this page and this prompt on its display screen. The prompt comprises, for example, the display of a message such as "please now enter a message different from messages you have already entered".

During a step 406, the user enters a first message, using the user terminal. Possibly, the site's server prohibits the same message being entered during two successive accesses to the site by the user, to prevent learning by a fraud site.

The message can take various forms, for example:
  alphanumeric, for example by keyboard entry in an entry field displayed on a display screen of the user terminal;
  audible, especially vocal, by a microphone of the user terminal capturing the sound;
  visual, by capturing a photo or a series of images of the user; or
  by a screenshot, at least partial, for example comprising a pointer whose position is commanded by the user, for example by means of a computer mouse.

Thus, the message can represent the acquiescence of the user (gesture, nod of the head, word of agreement, confirmation click, etc). In the event of a subsequent dispute, this can be produced by the website's operator or by the user.

During a step 408, the user terminal transmits the first message to a server of the site, for example to the server hosting the site or to a security server linked to the server hosting the site.

During a step 410, a server (the server hosting the site or an associated security server) encrypts the first message to supply a visible code.

During a step 412, the server hosting the website transmits the visible code to the user terminal, and the user terminal displays this visible code on its display screen, preferably in a page of the site.

During a step 414, the user starts a decryption system on the user terminal.

During a step 416, the user captures an image of the visible code using an image sensor of the user terminal.

During a step 418, the decryption system decrypts the visible code and supplies the first message.

During a step 420, the user terminal supplies the first message to the user. The user verifies this first message during a step 422. The way the message is supplied depends on its format. If the message was entered on a keyboard, the supply consists of displaying this message on a display screen of the user terminal. If the message is visual, for example a photo of the user or a series of images of the user or a capture, partial or not, of the movement of a pointer on a page of the site, supplying the message consists of displaying one or more images on the display screen of the user terminal. If the message is audible, especially vocal, supplying the message consists of a loudspeaker playing the sound message.

If the message displayed on the user terminal is different from the first message entered by the user during the step 206, the user knows that he is not on a legitimate site.

It can be seen that the method described with reference to FIG. 4 operates according to the challenge-response method, the challenge being freely chosen by the user and the response being identical to the challenge but after encryption and decryption. The correspondence between the encryption and decryption ensures authentication of the site by the user.

In a variant, during steps 410 to 420, the visible code is also representative of a second message, for example a personal identification code ("PIN"). This personal code, generated by the server of the site, is therefore displayed by the user terminal during the step 420. In this case, during a step 424, the user enters the personal code, with the keyboard of the user terminal or on a virtual keyboard displayed on the screen of the user terminal. This personal code is transmitted to the server hosting the website and, if applicable, to the security server.

During a step 426, the server that generated the code to be displayed verifies the personal code. If this personal code is correct, navigation on the website is authorized.

In a variant, the first message entered by the user during the step 406 is a question from a limited number of questions, the response to which has previously been supplied to the server hosting the website by the user, for example when registering for the services of this site. In this case, during the step 410, the server finds the response to the question asked, in its memory of responses, and encrypts this response to supply the code to be displayed on the user terminal.

The invention claimed is:

1. Method for securing access to a website, which includes a step of a first user terminal accessing said website, characterized in that it comprises, next and in series:
   - a step of entering a message, using the first user terminal, on a page of the website;
   - a step of transmitting the message to a server of the website;
   - a step of encrypting the message by the server of the website in order to form a visible code;
   - a step of displaying the visible code on a display screen of the first user terminal;
   - a step of taking an image of the visible code using a second user terminal, optionally identical to the first user terminal;
   - a step of decrypting the visible code using the second user terminal; and
   - a step of providing a user of the first and second user terminal with the message decrypted by the second user terminal.

2. Method according to claim 1, wherein the message represents a gesture by the user.

3. Method according to claim 1, wherein the message comprises a series of images of the user.

4. Method according to claim 1, wherein the message comprises an alphanumeric portion entered by the user.

5. Method according to claim 1, wherein the message comprises at least one item of biometric data of the user.

6. Method according to claim 1, wherein the message comprises a photograph of the user.

7. Method according to claim 1, wherein the message comprises a phrase spoken by the user.

8. Method according to claim 1, wherein the message is representative of a pointer movement made by the user.

9. Method according to claim 1, wherein the visible code takes the form of a logo of the website.

10. Method according to claim 1, which also comprises a step of generating a personal code by the server, a step of transmitting the personal code within the visible code, and a step of the user, with the first user terminal, entering on a page of the site the personal code displayed by the second user terminal.

11. Method according to claim 1, wherein the second user terminal is different from the first user terminal.

12. Method according to claim 11, which comprises a step of entering a personal code displayed by the second user terminal.

13. Method according to claim 1, wherein the second user terminal and the first user terminal are one and the same, the image capture being commanded by a decryption system utilized by the first terminal.

* * * * *